US006606500B1

(12) United States Patent
Kronestedt

(10) Patent No.: US 6,606,500 B1
(45) Date of Patent: Aug. 12, 2003

(54) METHOD AND A DEVICE FOR IMPROVING THE CAPACITY OF A GSM BASE STATION

(75) Inventor: Fredric Kronestedt, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 409 days.

(21) Appl. No.: 09/645,038

(22) Filed: Aug. 24, 2000

(30) Foreign Application Priority Data

Aug. 27, 1999 (SE) ................................................ 9903034

(51) Int. Cl.[7] ........................... H04Q 7/20; H04B 1/713
(52) U.S. Cl. ....................... 455/453; 455/446; 455/436; 375/132
(58) Field of Search ................................. 455/453, 446, 455/447, 450, 436, 25; 370/328, 329, 330; 375/132, 133, 135

(56) References Cited

U.S. PATENT DOCUMENTS 6,112,094 A * 8/2000 Dent ........................... 455/452
6,138,019 A * 10/2000 Trompower et al. ......... 455/436
6,522,643 B1 * 2/2003 Jacomb-Hood et al. ..... 370/347

OTHER PUBLICATIONS

Kronestedt et al, "Adaptive Antennas in Frequency Hopping GSM", IEEE 1998 International Conference on Universal Personal Communications, 1998, ICUPC '98, vol. 1, 1998, pp. 325–329.

Patent Abstracts of Japan, 11–251996 A (Kokusai Electric Co Ltd), Sep. 17, 1999.

Torrieri et al, "An Anticipative Adaptive Array for Frequency–Hopping Communications", IEEE Transactions on Aerospace and Electronic System, US, vol. 24, No. 4, Jul. 1998, New York, pp. 449–456.

* cited by examiner

Primary Examiner—Edward F. Urban
Assistant Examiner—Erika A. Gary
(74) Attorney, Agent, or Firm—Nixon & Vanderhye, P.C.

(57) ABSTRACT

The invention relates to a method and a device for supporting traffic loads to a very high extent for a cell (2) of a radio base station (1) in a cellular radio communication network in communication with mobile stations (MSA, MSB, MSC) within the range of the radio base station. Frequency hopping and adaptive antenna is used to provide at least two cell regions. A hopping list (HSN) of frequencies for the cell is allocated, and the frequency offset numbers (MAIOs) in the hopping list, to set the allowable frequency hopping procedure of the cell. The position in the cell for each mobile station within the cell boundary is determined. A frequency offset number (MAIO) is allocated for each mobile station. The cell is provided with at least one different lobe (L1', L2';L1", L2", L3") for each cell region using at least one different adaptive antenna lobe for each cell region. The lobes in the cell have suppression between each other. A different set of the frequency offset numbers (MAIOs) is assigned for each region. Each set for each of the cell regions has a value increment by at least two, and so that different regions have different sets of the frequency offset numbers (MAIOs) not overlapping each other.

14 Claims, 3 Drawing Sheets

METHOD AND A DEVICE FOR IMPROVING THE CAPACITY OF A GSM BASE STATION

This invention relates to a method for improving the capacity of a GSM base station in accordance with the preamble of claim 1, and a device to embody the method.

FIELD OF THE INVENTION

The present invention relates generally to the field of cellular radio communication, and in particular to base stations in a radio communication network.

BACKGROUND

The usage of mobile radio telephony has increased enormously during the past decade. As the load on the existing mobile radio systems is continuously increasing, it becomes more and more important to efficiently utilise the scarce frequency resources. A lot of effort is today put into optimising, given a certain amount of bandwidth, the number of connections with acceptable channel quality.

One way of improving the capacity of a mobile radio network is to introduce so called frequency hopping. When using frequency hopping in a network, the frequency used for transmission on a certain connection is changed at regular intervals. This results in an increased quality of the radio connection due to both the frequency diversity and the interference diversity hereby obtained (see e.g. H. Olofsson et al. "Interference diversity as means for increased capacity in GSM", published EMPCC '95). Frequency hopping is used mainly because radio signals are subjected to multipath fading, which is space and frequency selective, but also to avoid interference with strong signals from neighbour cells transmitting on or close to the actual carrier frequency. Since the quality of the ongoing connections is generally increased as a result of the introduction of frequency hopping, a quality decrease caused by an increased number of connections in the system can be accepted. Thus, the quality increase can be traded for increased capacity.

Frequency hopping is introduced to a system by assigning to each connection a frequency hopping sequence that defines which frequency the connection will use at different points in time. Such a frequency hopping sequence may be defined by two different parameters:

a hopping sequence number, which defines the hopping sequence according to how the frequencies will vary, and a frequency offset number, which defines where in the hopping sequence the connection in question will be at a particular point in time (see e.g. Global System for Mobile Communication (GSM) Technical Specification 05.02).

In GSM, all transceivers in a cell are assigned the same hopping sequence number, while each transceiver in a cell is assigned a cell unique frequency offset number.

Hereby is achieved that a connection will not experience any co-channel interference from other connections within the same cell. It has been shown that in order to achieve the desirable interference diversity gain by introducing frequency hopping, the number of frequencies to hop between should be at least three or four. In many situations there are not that many frequencies available for each cell. This problem can be solved by applying one of at least two different methods (see T. Toftegård Nielsen et al., "Slow frequency hopping solutions for GSM networks of small bandwidth", published VTC '98).

1. The first method: By letting neighbouring cells form a pool of the frequencies allocated to each cell, where each transceiver being a member of the pool, utilises all frequencies available in the pool, the number of frequencies available for frequency hopping increases for each cell. To avoid co-channel interference within these neighbouring cells, the same hopping sequence is applied to each cell, but a unique frequency offset number is assigned to each transceiver. This solution, however, requires, that the cells are synchronised with each other.

2. The second method: The number of frequencies available for frequency hopping could be increased by using a small frequency reuse distance and thus obtain a high number of frequencies in each cell. In order to avoid an unacceptable level of co-channel interference the load on each frequency has to be limited.

Another way of increasing the capacity in a mobile radio network is to introduce so called adaptive antennas. Conventional antennas, which have an antenna lobe form which is static, are replaced by adaptive antennas, which can vary the form of the antenna lobe as well as the direction in which the antenna lobe is transmitted. This is provided by having an antenna array having a ½ wavelength distance between each other co-operating to form a lobe if different signal shifts are provided on the different antenna elements adapted to the wished lobe-form and lobe-direction.

A narrow antenna lobe can thus be directed towards the particular mobile station, which the base station is presently serving, instead of having an antenna lobe which covers the entire cell as is the case when a conventional antenna is used. Hereby is achieved that the overall interference level in the system is reduced, since each base station transceiver on the down-link transmits with narrow lobes in more concentrated geographical regions. Each base station receiver on the up-link rejects signals from other directions than the direction that it is presently configured for. For more detailed information regarding adaptive antennas, see e.g. S. Anderson et al. "Adaptive Antennas for GSM and TDMA Systems", published IEEE Personal Communications June 1999.

The effects of combining the use of adaptive antennas and frequency hopping in the same network has been investigated by F. Kronestedt et al. in "Adaptive Antennas in Frequency hopping GSM", published ICUPC 1998. It has been found that in such networks the frequency reuse plan can be very tight. As mentioned in the CONCLUSIONS in the publication it is possible to carry full load in a ⅓ cell reuse case without DTX (Discontinuous Transmission) or power control. Even a ¼ cell reuse (all frequencies are used in every cell) might be possible as long as the channel utilisation is kept below 70%.

The problem discussed above of having too few frequencies available for hopping in each cell does not appear if the channel utilisation is kept on a low level. However, a limitation may be set for adjacent channel interference effects. With a tight reuse, such as ⅓ or ¼, adjacent frequencies may be assigned to a cell. Thus, adjacent frequencies may be used simultaneously in a cell and adjacent interference from own cell will occur. This is very severe since the interfering signal (the adjacent interference) arises from the same base station as the desired signal.

In GSM, the frequency hopping procedure is described by two parameters in combination, i.e. MAIO (Mobile Allocation Index Office) and HSN (Hopping Sequence Number). In a cell each transceiver (TRX) is assigned the same HSN as the other transceivers in the cell, but a unique MAIO. The table below shows an example of this procedure for a cell A:

| Cell A | HSN | MAIO |
|--------|-----|------|
| TRX1   | 1   | 5    |
| TRX2   | 1   | 7    |
| TRX3   | 1   | 9    |

In this way, two transceivers in a cell will never use the same frequency simultaneously. Further, also exemplified in the table above, allocating MAIO in such a way that its value increments by at least 2 between TRXs in a cell results in that adjacent channel interference from the own cell is completely avoided. Adjacent frequencies are never used simultaneously.

If two TRXs in a cell have consecutive MAIO, adjacent channel interference will occur at every burst. This undesired behaviour would occur in the example below for a cell B:

| Cell B | HSN | MAIO |
|--------|-----|------|
| TRX1   | 0   | 5    |
| TRX2   | 0   | 6    |

This implies that consecutive MAIOs for a cell could not be used in the Prior Art networks. However, a drawback with the state of the art MAIO is, that allocation is only possible as long as the number of frequencies in the hopping sequence is twice as many as the number of installed transceivers in the cell. The reason is that the MAIO can only take as many values as the number of frequencies in the hopping sequence. In order to avoid adjacent channel interference only every second MAIO can be utilised. This criterion for Prior Art networks with conventional antenna techniques can be expressed in another way: the traffic load, defined as the number of TRXs per cell divided with the number of hopping frequencies per cell, must be below 50%, and in the reality lower than that in order to avoid interference from other cells.

However, simulations have shown that it could be possible for networks equipped with adaptive antennas to support traffic loads of up to 80 to 100%.

SUMMARY

A problem to be solved according to the invention is thus to provide a method and/or a device to make it possible to use adjacent frequencies in one cell and be able to carry full load, or at least traffic load above 50% and still avoid adjacent cannel interference.

The solution according to the invention is to take the different antenna lobes and the MAIO used for each user into account. The general MAIO allocation rule is to make sure that mobiles with antenna lobes which can disturb each other severely are allocated MAIO incremented by at least 2, i.e. providing no adjacent channel interference. This may occur when users are located in the same direction or in directions very near to each other. However, if the users are separated such that they are seated within lobes with high suppression between each other they can be allocated MAIO incremented by 1.

Thus, the invention relates to a method and a device for making it able to support traffic loads to a very high extent for a cell of a radio base station in a cellular radio communication network in communication with mobile stations within the range of the radio base station. Frequency hopping and adaptive antenna means is used to provide at least two cell regions. A hopping list (HSN) of frequencies for the cell is allocated, and the frequency offset numbers (MAIOs) in the hopping list, to set the allowable frequency hopping procedure of the cell. The position in the cell for each mobile station within the cell boundary is determined. A frequency offset number (MAIO) is allocated for each mobile station. The cell is provided with at least one different lobe for each said cell region using a different adaptive antenna lobe for each said cell region. The lobes in the cell have suppression between each other. A different set of the frequency offset numbers (MAIOs) is assigned for each region. Each set for each of the cell regions has a value increment by at least two, and so that different regions have different sets of the frequency offset numbers (MAIOs) not overlapping each other.

The frequency offset numbers (MAIOs) to be used in a whole cell could have a value increment by one. Preferably, the adaptive antenna lobes are predetermined and fixed. If two cell regions then are provided, each defined by at least one lobe, allocating the frequency offset numbers (MAIOs) for one of the regions the values 1, 3, 5, etc. and the frequency offset numbers (MAIOs) for the other one of the regions the values 2, 4, 6, etc. could be the preferred one. If there are at least two lobes per region where the neighbouring lobes partly overlap each other, for the lobes nearest to a border line between the two regions, the lobe in one of the regions is allocated the smallest MAIO values in that region. The lobe in the other region is allocated the highest MAIO values in that region.

An intra-cell hand-over could be performed when one of the mobile stations moves from one of said cell regions to another. The intra-cell hand-over comprises then at least a change of the frequency offset number (MAIO) assigned to the radio connection in the cell region, from which the mobile station is moving, into a frequency offset number from the set of frequency offset numbers allocated to the cell region, to which the mobile station is moving.

ADVANTAGE

The invention minimises the adjacent channel interference from the own cell (within cell) when using adaptive antennas in ⅓ and ¼ reuse cases. This implies improved quality and/or capacity.

BRIEF DESCRIPTION OF THE DRAWINGS

The present invention will now be discussed in more detail with reference to preferred embodiments of the present invention, given only by way of example, and illustrated in the accompanying drawings, in which.

DETAILED DESCRIPTION OF EMBODIMENTS

Figure 1:
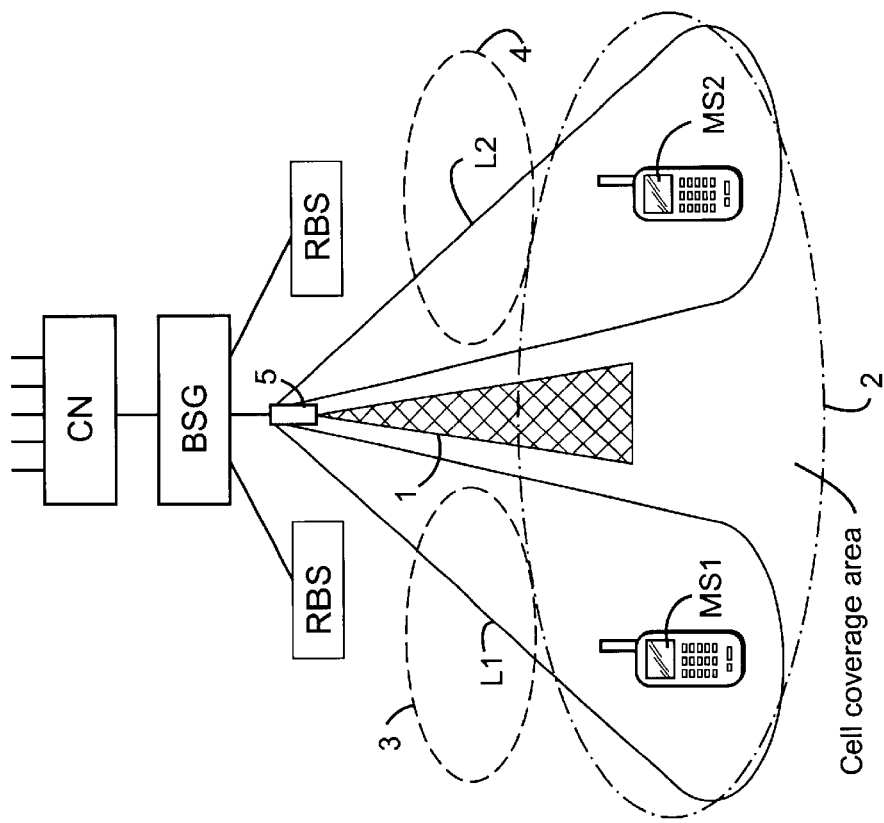
FIG. 1 illustrates a prior art adaptive antenna radio base station serving two mobiles at different angular positions with different narrow lobes.

Referring to FIG. 1, illustrating a prior art system, a cellular mobile radio network, for example GSM (Global System for Mobile communication), provides radio communication to users of mobile stations MS1, MS2 such as mobile telephones. A core network CN controls calls to and from other networks, such as Public Switched Telephone Networks (PSTN), Integrated Services Digital Networks (ISDN), other Public Land Mobile Networks (PLMN), Internet etc. The core network CN is connected to a Base Station Controller BSC which in turn is connected to several Radio Base Stations RBS. Each RBS, such as the radio base station site 1, can communicate with mobile stations MS1, MS2, using radio links, within its radio coverage area, below called distribution area.

Each RBS transmits on a number of separated radio frequencies, i.e. a number of carriers. To each RBS frequency (downlink frequency) there is a corresponding frequency which is used by the MS (uplink frequency).

Radio Base Stations RBS for mobile telephones often transmit and receive the communications with the mobile sets within their distribution area in sectors, each sector representing a cell.

In FIG. 1 a radio base station site 1 is divided into three cells with a coverage area 2, 3, and 4, respectively, each having a separate directed antenna means (not shown) as is common art particularly in dense traffic areas. At least one of the cells, such as the cell having the cell coverage area 2, is provided with an adaptive antenna arrangement 5. This antenna arrangement is able to send out at least two downlink lobes L1 and L2 directed towards each one of two mobile stations MS1 and MS2 positioned inside the cell coverage area 2. Each of these lobes represents a separate cell region.

HSN is a prepared list of hopping frequencies and a MAIO indicates where a particular mobile station should go in into the HSN. Different cells, such as those having the cell areas 3 and 4, have different HSN and will therefore disturb each other only intermittently, if co-frequencies and adjacent frequencies are used at the cells. This fact is also true for cells belonging to neighbouring base station sites.

As according to prior art techniques the mobile stations were allocated the same hopping sequence number (HSN) and MAIOs which had values incremented with at least 2. According to the invention the mobile stations within a cell coverage area can have MAlOs separated by 1.

Figure 2:
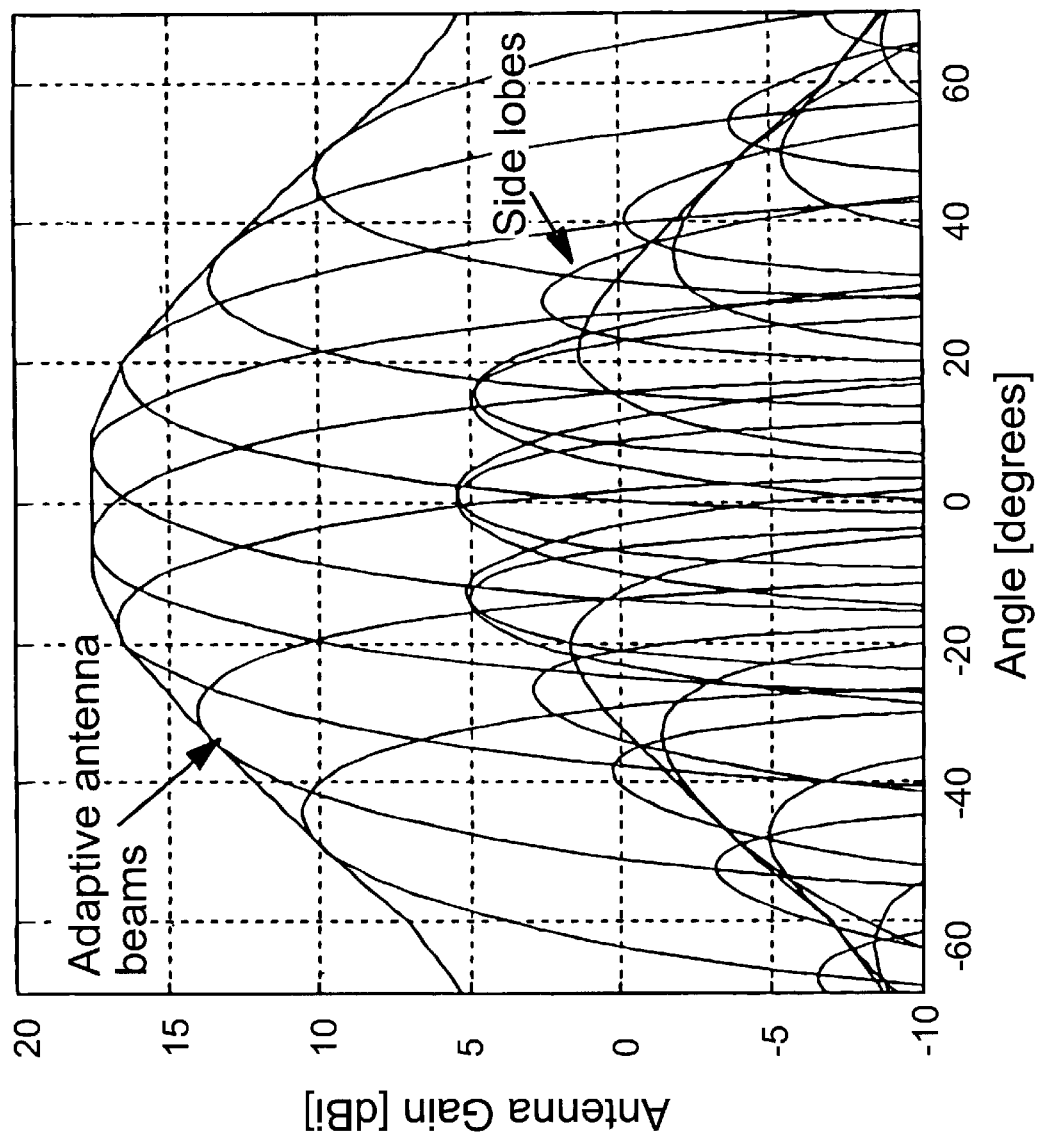
FIG. 2 illustrates a lobe pattern of an adaptive radio base station antenna having fixed narrow lobes.

FIG. 2 illustrates shows lobe patterns of the base station antenna with the adaptive antenna lobes. It is apparent that mobile stations provided within two adjacent adaptive antenna lobes could not have the same HSN and MAIO incremented by 1. However, if the lobes are narrow, have a high suppression between each other, and directed at different directions then each of them could have a mobile station allocated a MAIO, which is incremented or decremented by 1 in relation to a MAIO within another lobe. However, if two mobile sets are positioned within the same narrow lobe or adjacent partly overlapping lobes then the MAIOs should have their values incremented by at least 2 between TRXs in the cell.

Figure 3:
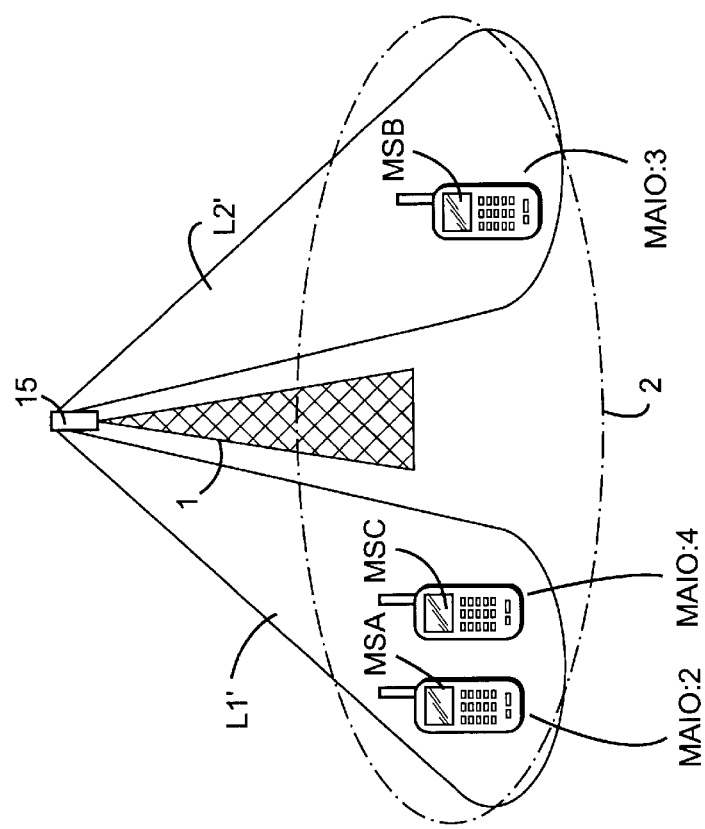
FIG. 3 illustrates a first embodiment of an adaptive antenna radio base station according to the invention serving three mobiles.

Referring to FIG. 3, the same kind of radio base station site 1 as in FIG. 1 has three cells, of which only the cell coverage area 2 is shown. The antenna arrangement 15 is illustrated to send out two lobes L1' and L2' controlled by the radio base station site 1 also in this case in the cell having the cell coverage area 2. However, according to the invention, the lobes do not share the same MAIOs. Instead, in the embodiment shown in FIG. 3; the first lobe L1' is provided with even numbered MAIOs, and the second lobe L2' is provided with odd numbered MAIOs, for example allocating the frequency offset numbers (MAIOs) for one of the regions the values 1, 3, 5, 7 etc. and the frequency offset numbers (MAIOs) for the other one of the regions the values 2, 4, 6, 8 etc.

Thus, if the lobes do not overlap each other substantially, there is no problem to have three mobile stations MSA, MSB, MSC having consecutive MAIOs in the same cell coverage area 2, as long as the two mobile stations MSA, MSC having communication through the same lobe L1' have their values increments by at least 2.

Spatially separated mobile stations served by different antenna lobes with high suppression in relation to each other thus can be allocated MAIO incremented by 1, such as the mobile stations MSA within the lobe L1' and the mobile station MSB in the lobe L2'. The gain of each antenna lobe is minimised in the direction of mobile stations outside its own lobe but inside its belonging cell. In this way adjacent channel interference can be tolerated.

If one of the mobile stations, such as MSC, inside the lobe L1' moves to the lobe L2' then an intra-cell hand-over should be performed to change its MAIO, in the case shown in FIG. 3 from an even number to an odd number. The intra-cell hand-over comprises then at least a change of the frequency offset number (MAIO) assigned to the radio connection in the cell region, from which the mobile station is moving, into a frequency offset number from the set of frequency offset numbers allocated to the cell region, to which the mobile station is moving. It is the radio base station or the BSC, which monitors and allocates the respective MAIOs to the mobile stations within the cell covering area.

A MAIO is allocated for each new mobile station entering a region, which MAIO preferably should have a number as far away as possible from the MAIOs allocated to mobile stations in the neighbouring region or regions. Thus, if the two mobile stations MSA and MSC have been allocated MAIO:2 and MAIO:4, as illustrated in FIG. 3, a mobile station newly entering the lobe L2' could be allocated MAIO:7, if available. In this way interference between the mobile stations could be further avoided in times with sparse traffic within the cell coverage area.

The mobile stations MSA and MSC are served by the same lobe, and this may cause disturbance. Therefore, the mobile stations MSA and MSC have to be allocated MAIO incremented by at least 2. Further, the mobile station MSB is located in another part of the cell having the cell coverage area 2, resulting in an antenna lobe L2' with high suppression towards and from the mobile stations MSA and MSC.

The mobile station MSB can thus use a MAIO value incremented by only 1 in relation to each of the other mobile stations MSA and MSC shown in FIG. 2. It is so since the adjacent channel interference towards and from the mobile stations MSA and MSC is suppressed by the antenna gain.

The inventive idea could also be applied in a system using distributed antennas, e.g. indoor, located in different rooms, where a signal can be transmitted from one or from several of the antennas. An example of such a set-up is shown by F. Kronestedt et al. in "Radio Network Performance for Indoor Cellular Systems", published ICUPC '96.

The FIG. 3 shows distinct lobes having a space between each other. In the practise the lobes L1' and L2' are formed to fill each half of the cell coverage area 2 so that a mobile station moving from one lobe to the other does not get lost during the transport between the cell regions.

Figure 4:
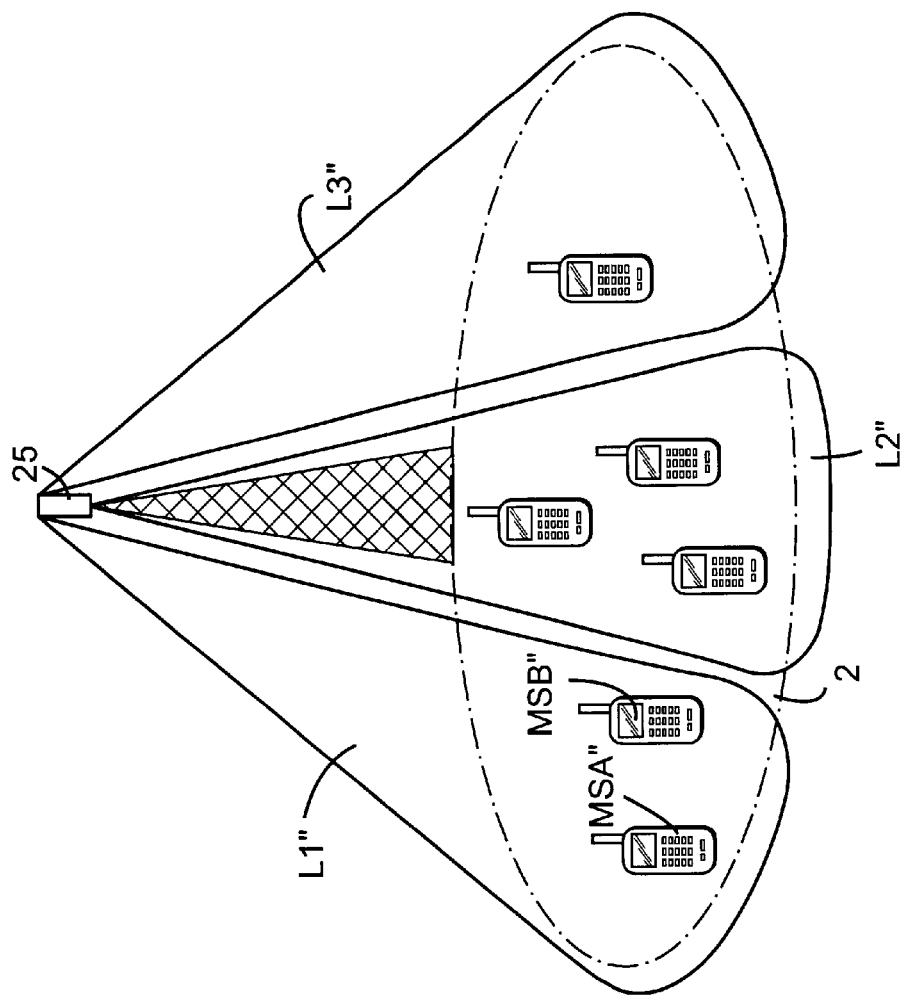
FIG. 4 illustrates a second embodiment of an adaptive antenna radio base station according to the invention serving three mobiles.

FIG. 4 shows another embodiment, in which there are three lobes covering the cell coverage area 2 and some mobile stations in each of them. In this embodiment it is possible to let the two mobile stations MSA", MSC" having communication through the same lobe L1" from the antenna 25 have their values increments by 3 between TRXs in the lobe. Thus, the lobe L1" can be allocated MAIOs having the values 1, 4, 7 etc., the lobe L2" the values 2, 5, 8 etc., and the lobe L3" the values 3, 6 etc.

Figure 5:
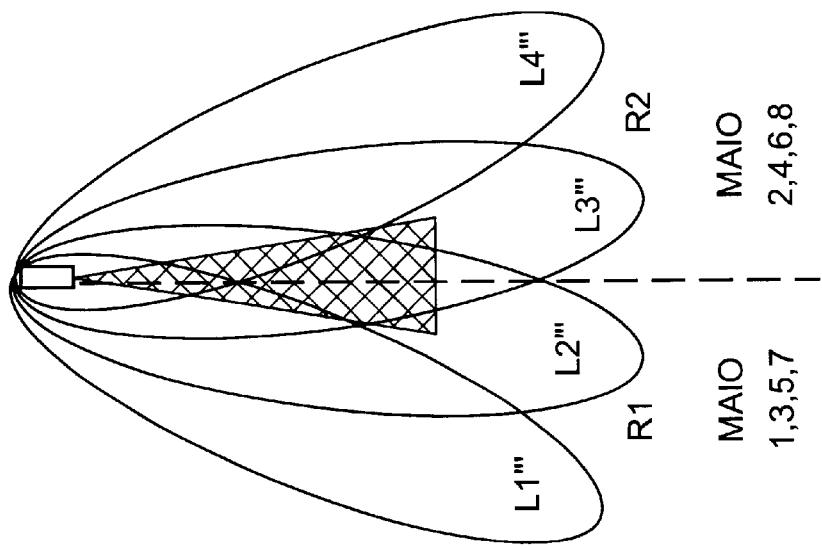
FIG. 5 illustrates another embodiment of an adaptive antenna radio base station according to the invention.

FIG. 5 shows a set-up where a radio base station is equipped with four fixed lobes L1'" to L4'" overlapping each other. Naturally more lobes could be provided even though four lobes are shown in this embodiment. The cell is divided into two cell regions R1 and R2. The lobes L1'" and L2'" belong to the cell region R1 while the lobes L3'" and L4'" belong to the cell region R2.

Further, the cell region R1 is assigned MAIO 1,3,5,7 while the cell region R2 is assigned MAIO 2, 4, 6, 8. As mentioned, the lobes overlap each other to some extent. For instance, the lobe L2'" and the lobe L3'" might create interference towards each other, if mobile stations served by the lobe L2'" and the lobe L3'" have MAIO values incremented by 1, e.g. MAIO 1 in the lobe L2'" and MAIO 2 in the lobe L3'".

This problem can be solved in the following way. Mobile stations served by the lobe L2'" should preferably be allocated the largest MAIO values from the MAIO values assigned for the cell region R1, thus the MAIO 7 or 5. Simultaneously, mobile stations in the cell region R2 served by the lobe L3'" should preferably be allocated the smallest MAIO values of the MAIO values assigned for the cell region R2, i.e. MAIO 2 or 4. At the region border between the lobes L2'" and L3'", where a lobe overlap exist, consecutive MAIOs are never used in order to avoid interference.

Although the invention is described with respect to exemplary embodiments it should be understood that modifications can be made without departing from the scope thereof. Accordingly, the invention should not be considered to be limited to the described embodiments, but defined only by the following claims, which are intended to embrace all equivalents thereof.

I claim:

1. A method for supporting traffic loads to a very high extent for a cell (2) of a radio base station (1) in a cellular radio communication network in communication with mobile stations (MSA, MSB, MSC) within the range of the radio base station by using frequency hopping and adaptive antenna means, to provide at least two cell regions, allocating a hopping list (HSN) of frequencies for the cell and the frequency offset numbers (MAIOs) in the hopping list to set the allowable frequency hopping procedure of the cell, determining the position in the cell for each mobile station within the cell boundary and allocating a frequency offset number (MAIO) for each mobile station, characterized by:

providing the cell with at least one different lobe (L1', L2';L1", L2", L3") for each cell region using at least one different adaptive antenna lobe for each said cell region, the lobes in the cell having suppression between each other;

assigning a different set of the frequency offset numbers (MAIOs) for each region, each set for each of the cell regions having a value increment by at least two, and so that different regions have different sets of the frequency offset numbers (MAIOs) not overlapping each other.

2. A method according to claim 1, characterized in that the frequency offset numbers (MAIOs) to be used in the cell as a whole have a value increment by one.

3. A method according to claim 2, further characterized by performing an intra-cell hand-over when one of the mobile stations moves from one of said cell regions to another, the intra-cell hand-over comprising at least a change of the frequency offset number (MAIO) assigned to the radio connection in the cell region from which the mobile station is moving into a frequency offset number from the set of frequency offset numbers allocated to the cell region to which the mobile station is moving.

4. A method according to claim 1, characterized in that the adaptive antenna lobes are predetermined and fixed.

5. A method according to claim 1 using two cell regions having at least one lobe per region, characterized by allocating the frequency offset numbers (MAIOs) for one of the regions (L1') odd values, such as 1, 3, 5, etc., and the frequency offset numbers (MAIOs) for the other one of the regions (L2') even values, such as 2, 4, 6, etc.

6. A method according to claim 5 having at least two lobes per region where the neighbouring lobes (L1'", L2'", L3'", L4'") partly overlap each other, characterized in that for the lobes (L2'", L3'") nearest to a border line between the two regions (R1, R2), the lobe (L2'") in one (R1) of the regions is allocated the smallest MAIO values in that region, and the lobe (L3'") in the other region (R2) is allocated the highest MAIO values in that region.

7. A method according to claim 1, characterized by allocating a MAIO for each new mobile station entering one of the cell regions, which MAIO has a number as far as available from the MAIOs allocated to mobile stations in the neighbouring region or regions.

8. A device for supporting traffic loads to a very high extent for a cell of a base station (1) in a cellular radio communication network in communication with mobile stations (MSA,MSB,MSC) within the range of the base station by using adaptive antenna means having antenna lobes (L1',L2') directed in different cell regions in the cell and frequency hopping, comprising:

a number of transceivers, each assigned the same frequency hopping list (hopping sequence number (HSN)) but a unique mobile allocation index offset (MAIO) in the hopping list, and means (1) for determining the cell region for each mobile station within the region and allocating a MAIO for each mobile station, characterized by means (5) for providing the cell with at least one different adaptive antenna lobe for each cell region, the lobes in the cell having suppression between each other;

means (1) for controlling the transceivers to assign a different set of MAIOs for each region each set having a value increment by at least two between the transceivers in each cell region but so that different cell regions have different sets of MAIOs not overlapping each other;

whereby the served mobiles occupy more than 50% or the traffic channels.

9. A device according to claim 8, characterized in that the transceivers in a cell have consecutive MAIOs but every pair of transceivers having consecutive MAIOs are allotted to different of the cell regions.

10. A device according to claim 8, characterized in that the adaptive antenna lobes (L1',L2';L1",L2",L3") are predetermined and fixed.

11. A device according to claim 8 using two cell regions, characterized in that:

the MAIOs allocated for one of the regions have odd values, such as 1, 3, 5, etc., and the MAIOs allocated for the other one of the regions have even values, such as 2, 4, 6, etc.

12. A device according to claim 11 having at least two lobes per region where the neighbouring lobes (L1''', L2''', L3''', L4''') partly overlap each other, characterized in that:
the means (5) for providing the cell with different adaptive antenna lobes, for each cell region for the lobes (L2''', L3''') nearest to a border line between the two regions (R1, R2), in one (R1) of the cell regions allocates the smallest MAIO values in that region to the lobe (L2'''), and in the other cell region (R1) allocates the highest MAIO values in that region to the lobe (L''').

13. A device according to claim 8, further characterized by means (1) to perform an intra-cell hand-over when one of the mobile stations moves from one of said cell regions to another, the intra-cell hand-over comprising at least a change of the frequency offset number (MAIO) assigned to the radio connection in the cell region from which the mobile station is moving into a frequency offset number from the set of frequency offset numbers allocated to the cell region to which the mobile station is moving.

14. A device according to claims 8, characterized by means (1) to allocate a MAIO for each new mobile station entering one of the cell regions, which MAIO has a number as far as possible from the MAIOs allocated to mobile stations in the neighbouring region or regions.

\* \* \* \* \*